United States Patent

Mildonian, Jr.

[15] 3,649,915

[45] Mar. 14, 1972

[54] DIGITAL DATA SCRAMBLER-DESCRAMBLER APPARATUS FOR IMPROVED ERROR PERFORMANCE

[72] Inventor: Harry Astour Mildonian, Jr., Matawan, N.J.

[73] Assignee: Bell Telephone Laboratories, Incorporated, Murray Hill, Berkeley Heights, N.J.

[22] Filed: June 22, 1970

[21] Appl. No.: 48,256

[52] U.S. Cl. ................325/42, 325/38 A, 325/41, 340/146.1

[51] Int. Cl. ..........................................................H04b 1/10

[58] Field of Search ........340/146.1 R, 146.1 AL, 146.1 AQ; 325/38 R, 38 A, 41, 42, 141, 323; 235/153, 154; 328/43, 46, 51, 58

[56] References Cited

UNITED STATES PATENTS 3,317,720 5/1967 Lender................................325/38 A

*Primary Examiner*—Robert L. Griffin

*Assistant Examiner*—Albert J. Mayer

*Attorney*—R. J. Guenther and E. W. Adams, Jr.

[57] ABSTRACT

The output of a digital encoder is delivered to a digital data scrambler prior to being encoded as a multilevel (e.g., quaternary) signal for transmission. The digital input to the scrambler is operated on in a deterministically randomized manner which results in a digital output that is modified so as to insure the virtual elimination of unwanted DC shift in the multilevel signal. At the receiving end of the transmission facility, the inverse operation, again deterministic, returns the received digital signal to its original form prior to the decoding operation. In the preferred embodiment, the scrambler (and descrambler) comprises a one-cell feedback shift register with a modulo-2 adder in the feedback coupling.

8 Claims, 10 Drawing Figures

INVENTOR
H. A. MILDONIAN, JR
BY John K. Mullarney
ATTORNEY

15-CELL SCRAMBLER

15-CELL DESCRAMBLER

6-CELL SCRAMBLER

6-CELL DESCRAMBLER

1-CELL SCRAMBLER

1-CELL DESCRAMBLER

DIGITAL DATA SCRAMBLER-DESCRAMBLER APPARATUS FOR IMPROVED ERROR PERFORMANCE

BACKGROUND OF THE INVENTION

This invention relates to digital data transmission systems and more particularly to apparatus for reducing the unwanted DC component which occurs due to the undesirable signal statistics of the inputs to such systems. The reduction results in a significant improvement in error performance.

In multilevel digital data transmission systems (e.g., quaternary transmission) it is necessary to establish sampling voltage thresholds so as to reliably distinguish between the possible levels of the incoming digital data. In certain data transmission systems, such as those using a coaxial cable or wire-pairs for transmission purposes, fixed voltage sampling thresholds can usually be utilized to advantage. However, in other digital data transmission systems, such as those using radio relay links as the transmission media, transmission impairment is often experienced. This is due in part to the introduction of an unwanted DC shift in the internally generated multilevel signal. In the presence of such a DC shift, the voltage threshold levels are correspondingly shifted and unless the same are accounted for in some fashion a degradation in error performance occurs. Various techniques, of varying degrees of complexity, have been proposed heretofore to account for this problem of shifting threshold levels. For example, a common approach is to vary the sampling voltage thresholds continuously and automatically so as to account for variations in the threshold levels of the transmitted multilevel digital data signal (see the copending application of L. C. Thomas, Ser. No. 691,526, filed Dec. 18, 1967, now U.S. Pat. No. 3,534,273).

The unwanted DC component can, of course, be minimized by the imposition of constraints on the source statistics of the digital data terminals, but the shortcomings of such an approach are thought obvious.

SUMMARY OF THE INVENTION

It is accordingly a primary object of the present invention to improve the error performance of digital data transmission systems.

It is a related object of the invention to substantially reduce the unwanted DC component which occurs due to the signal statistics of the inputs to a multilevel digital data transmission system.

A further object is to reduce the aforementioned DC component in a very simple, economic, yet highly reliable fashion.

The output of a digital encoder is delivered, in accordance with the invention, to a digital data scrambler prior to being encoded as a multilevel (e.g., quaternary) signal for transmission. The digital input to the scrambler is operated on in a deterministically randomized manner which results in a modified digital output that contains a substantially reduced DC component. At the receiving end of the transmission facility, the inverse operation, again deterministic, returns the received digital signal to its original form prior to the decoding operation. The digital data scrambler (and descrambler) comprises a feedback shift register of *n*-cells and at least one modulo-2 adder.

In the preferred embodiment of the invention the scrambler (and descrambler) comprises a one-cell feedback shift register with a modulo-2 adder in the feedback coupling. This very simple arrangement contains obvious advantages in circuit economy and it has proven to be significantly more efficient in transmission error performance.

A particularly advantageous feature of the aforementioned one-cell feedback scrambler-descrambler apparatus is its use in modifying the signal statistics of the inputs of certain digital data systems (such as the Bell System's T1 and T2 Carrier Systems) such that intersystem far-end crosstalk is significantly reduced and degradation in error performance thus minimized.

BRIEF DESCRIPTION OF THE DRAWINGS

These and other objects and features of the invention will be more readily appreciated as the same becomes better understood by reference to the following detailed description when considered in connection with the accompanying drawings in which.

DETAILED DESCRIPTION

Figure 1:
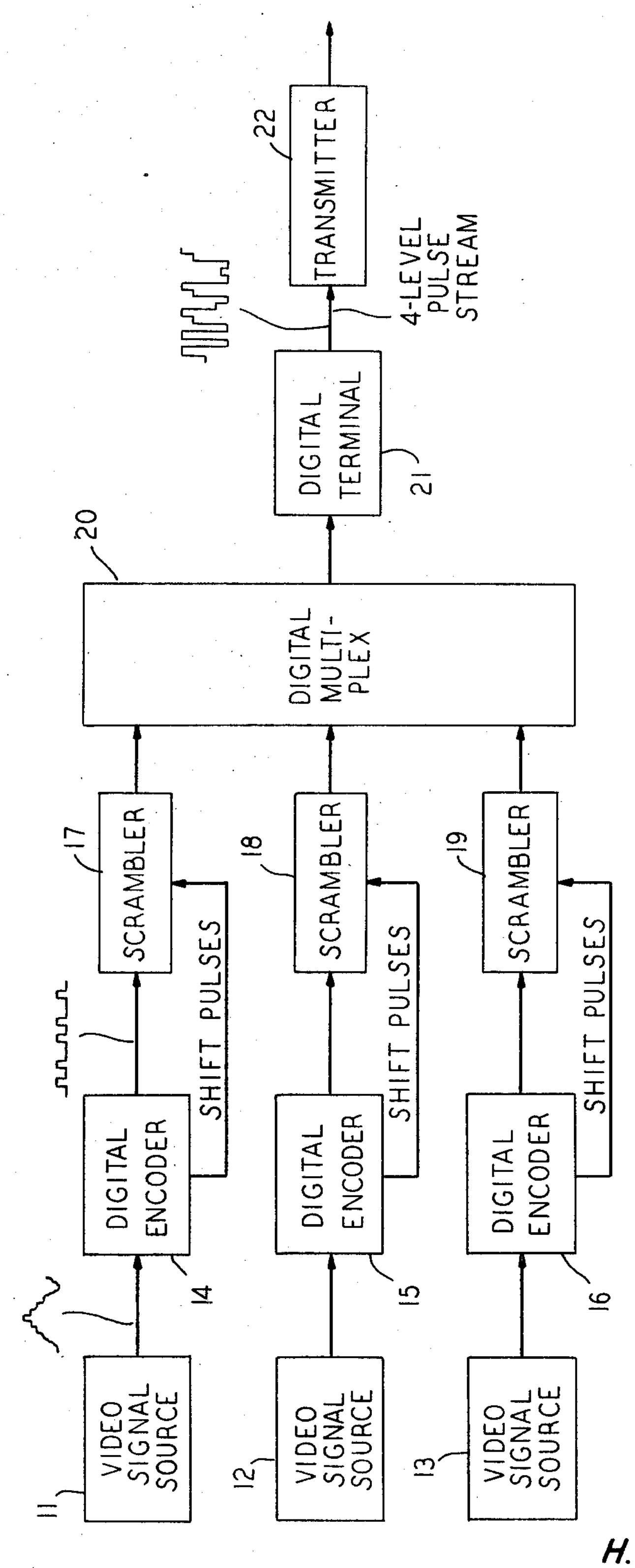
FIG. 1 is a simplified schematic block diagram of a typical digital data transmission system that incorporates apparatus in accordance with the invention.

Turning now to FIG. 1 of the drawings, there is shown a typical digital data transmission system that incorporates scrambler-descrambler apparatus in accordance with the invention. The transmission system itself constitutes no part of the present invention and it will be obvious to those in the art that the inventive concepts here disclosed can be used with other and different multilevel digital transmission systems. The system shown in FIG. 1 is itself disclosed in detail in the article "Transmission Across Town or Across the Country" by D. W. Nast and I. Welber, *Bell Telephone Laboratories Record*, Vol. 47, No. 5, May–June 1969, pages 162–168. Accordingly, the same will only be discussed briefly herein. The video signal sources 11 through 13 may comprise video telephone sets, which have been extensively described in the literature, e.g., see the above-noted issue of the Bell Laboratories Record. The analog output signals from sources 11–13 are delivered to the digital encoders 14 through 16, respectively, which comprise three-bit differential pulse code modulators (DPCM), the operation of the latter also being described in the above-noted Record article. The three-bit DPCM encoders possess certain advantages that are noted in the Record article. The digital encoder outputs are next coupled to the respective scramblers 17 through 19, to be described hereinafter, and the modified digital outputs of the latter are then time division multiplexed in the digital multiplex apparatus 20, with the output of the latter converted to a multilevel signal (i.e., a quaternary signal) in digital terminal 21. The four-level pulse stream from digital terminal 21 is then delivered to the transmitter apparatus 22 of the Bell System's TD-2 microwave radio relay transmission facility.

As will be appreciated by those in the art, the receiving apparatus at the other end of the transmission facility is essentially the inverse of the transmission equipment shown in FIG. 1 and, hence, a block diagram schematic of the same is not believed necessary. The descramblers in the receiving apparatus are disposed between the digital demultiplexer and the decoders and they serve to return the received digital signals to their original form prior to the decoding operation.

The scrambling-descrambling operations carried out in accordance with the invention are completely independent of the multilevel transmission system. For example, the analog signals encoded for transmission need not be video signals, time division multiplexing of a plurality of encoded signal sources is only incidental, and an encoded-scrambled signal can just as readily be transmitted, in simplex fashion, as a multilevel signal over any of the other known transmission facilities useful for this purpose. So much for the transmission system per se.

More or less continuous signal patterns (i.e., continuous binary ones or zeros) often occur in digital data message signal systems, especially during idle conditions. Tests have shown that multilevel digital data transmission systems have an error performance that is input pattern dependent. This is due to a large extent to the introduction of an unwanted DC shift in the internally generated multilevel signal, such as that resulting from the aforementioned continuous signal patterns. In the presence of this shift, the voltage threshold levels are also shifted and a degradation in error performance results. The purpose of the instant invention is to essentially eliminate the unwanted DC component and thereby improve the overall error performance of such digital data transmission systems.

Figure 2A:
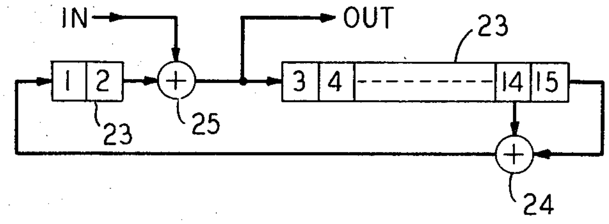
FIGS. 2A and 2B illustrate a 15-cell scrambler and a 15-cell descrambler, respectively, which can be advantageously utilized in the digital system of FIG. 1 in accordance with the invention.

A scrambler utilized in accordance with the present invention is shown in FIG. 2A. The scrambler comprises a feedback shift register 23, a modulo-2 adder 24 in the feedback coupling path and a moudlo-2 adder 25 to which the digital bit stream from the digital encoder (e.g., encoder 14) is delivered. The shift register 23 comprises 15 cells or stages, with the shift pulses therefor being derived from a clock (not shown) associated with the encoder. The modulo-2 additions (sometimes termed an EXCLUSIVE-OR operation) are straightforward and are well known in the art; see FIG. 2 of the U.S. Pat. to R. Fracassi, No. 3,139,605, issued June 30, 1964, which is a symbolic diagram of a modulo-2 addition. The digital input to the scrambler is operated on in a deterministically randomized manner which results in a modified digital output that contains a substantially reduced DC component. The improvement in error performance achieved by this scrambler is shown in FIG. 3. The transmission system used in this test was essentially that illustrated in FIG. 1, operating at a 20.2 mb. rate.

The FIG. 2A scrambler per se is not considered to be particularly novel to applicant. Scramblers have been extensively described in the literature (see "Digital Communications with Space Applications" edited by S. W. Golomb, Prentice-Hall, Inc. (1964), pages 7–15) and they have been utilized in various patented apparatus for various purposes, primarily in error correcting code applications (e.g., see the cited Fracassi patent supra, and the U.S. Pats. to Rupp et al., No. 3,398,400, issued Aug. 20, 1968, and Van Duuren, No. 3,418,630, issued Dec. 24, 1968). However, the use of this scrambler in the disclosed context to eliminate the unwanted DC component and thereby improve the error performance of multilevel digital data transmission systems is believed new.

The typical modulo-2 adder is known to possess some inherent time delay. Accordingly, rather than place the adder 25 at the input to the shift register 23 and have its inherent delay in effect added to that of the adder 24, the same was inserted, as shown, in the shift register 23. The timing requirements of the shift pulses can, in this fashion, be somewhat relaxed.

The deterministically randomized output signal of the scrambler is coupled from the adder 25 output to the digital multiplexer 20. If timing considerations are significant, the output signal can be advantageously derived from cell-3, for example, of the shift register. The scrambled output signal in this case is, of course, the same, but delayed slightly.

Figure 2B:
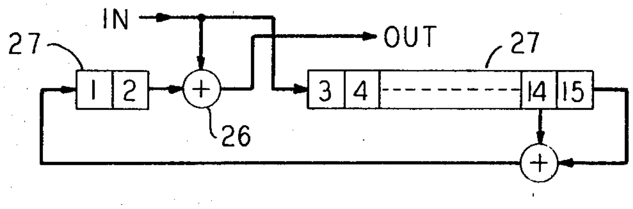
Figure 3:
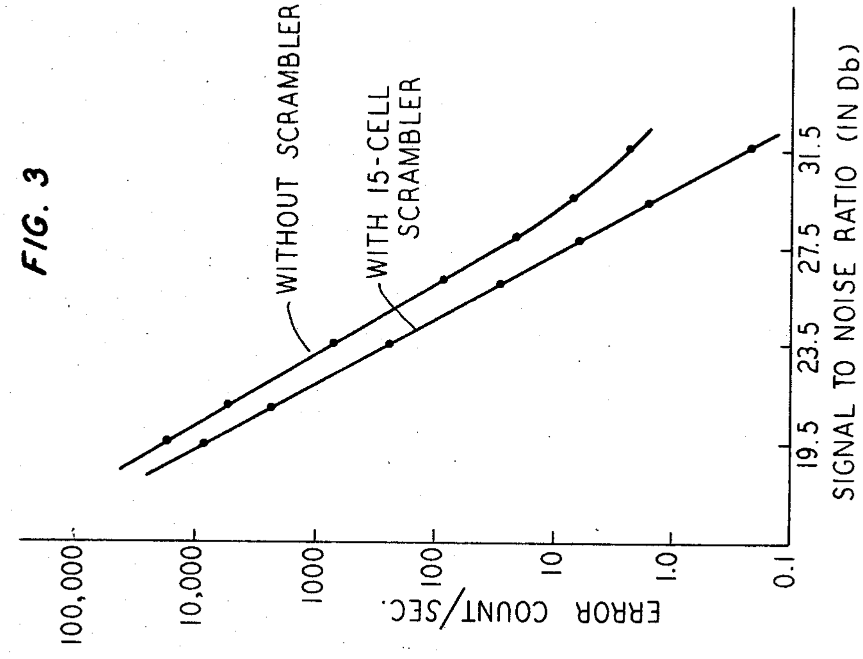
FIG. 3 shows a pair of curves that illustrate the improvement in error performance realized with a 15-cell scrambler.

The descrambler of FIG. 2B is utilized at the receiver and it performs the inverse of the operation carried out by the scrambler of FIG. 2A. In basic configuration it is necessarily similar to the scrambler configuration. The deterministically randomized digital bit stream from the demultiplexer of the receiver apparatus is delivered to the modulo-2 adder 26 and to the third cell or stage of the shift register 27. The descrambler carries out the inverse operation, again deterministic, and thereby returns the received digital signal to its original form prior to the decoding operation. The output of the descrambler is taken from the adder 26 and coupled to the decoder (not shown).

It has been the practice heretofore to use scramblers of increasing complexity—e.g., feedback registers of longer and longer chains or stages. The reasons for this are well known, namely, the greater the number of cells or stages used the longer the periodicity of the quasi-random output signal and hence the more efficient and attractive the error correcting code generator. Contrary to this prior art practice, it has been found by applicant to be more advantageous, for the purpose of elimination of unwanted DC shift, and the reduction of error multiplicity, to utilize scramblers having fewer cells or stages in the feedback register.

Figure 4A:
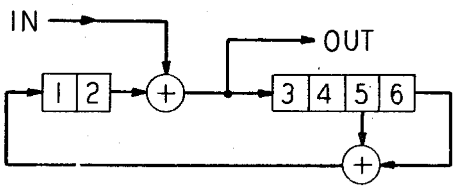
FIGS. 4A and 4B, respectively, illustrate a six-cell scrambler and a six-cell descrambler which can also be utilized in the digital system of FIG. 1.

In FIG. 4A, a six-cell scrambler is shown which functions in essentially the same fashion as the 15-cell scrambler of FIG. 2A. In fact, the only significant difference between the scramblers of FIGS. 2A and 4A is in the number of cells in the feedback register. Accordingly, no further discussion of this latter scrambler seems necessary.

Figure 4B:
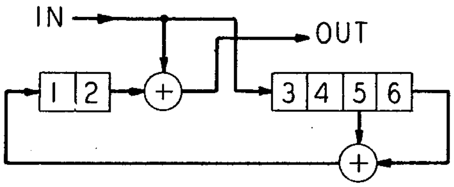

The descrambler of FIG. 4B is, again, similar in configuration to the scrambler configuration of FIG. 4A and it serves to return the received deterministically randomized digital signal to its original form prior to the decoding operation. This descrambler is, of course, different from the 15-cell descrambler of FIG. 2B, but, here again, only in regard to the number of stages in the feedback register.

A detailed functional description herein of the 15-cell and six-cell scramblers and descramblers is not considered necessary inasmuch as the components thereof are widely known and extensively used, they are of relatively simple operation and the combination thereof is extensively described in the published literature, such as that noted above. A very detailed theoretical explanation of scramblers and descramblers is set forth in the article "Some Simple Self-Synchronizing Digital Data Scramblers" by J. E. Savage, *The Bell System Technical Journal*, Volume XLVI, No. 2, Feb. 1967, pages 449–487.

Figure 5A:
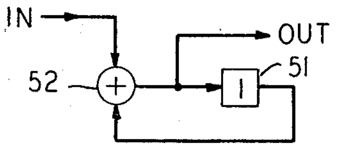
FIGS. 5A and 5B illustrate a one-cell scrambler and a one-cell descrambler, respectively, which can be used to particular advantage in the system of FIG. 1.
Figure 5B:
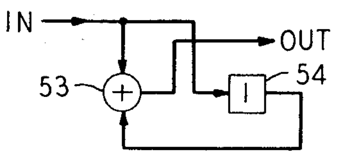

The preferred embodiment of the present invention is shown in FIGS. 5A and 5B. The scrambler of FIG. 5A comprises a one-cell feedback shift register 51 in combination with a single modulo-2 adder 52, the latter being connected in the feedback path of the register. This simple scrambler arrangement contains obvious advantages in circuit economy and it has proven to be significantly more efficient in error performance. The digital bits from the encoder are serially delivered to the input of adder 52 each bit is added in modulo-2 fashion to the bit stored in register 51. This addition results in the binary "1" or "0" bit, depending upon the input binary signals, at the output of the adder and this signal bit is coupled to the multiplexer 20 and to the input of the register 51 where it is temporarily stored for the next modulo-2 addition. The operation is repetitive and continuous.

The descrambler of FIG. 5B is used at the receiver and it performs the inverse of the operation carried out by the scrambler of FIG. 5A. The deterministically randomized digital bits from the demultiplexer of the receiver apparatus are serially coupled to the modulo-2 adder 53 and to the input of the one-cell shift register 54. Each input bit is added in a modulo-2 manner with the bit previously stored in register 54 and the output digital bit stream from adder 53 is coupled to the receiver decoder (not shown). The descrambling operation is the inverse of the scrambler action and hence the received digital signal is returned to its original form prior to decoding.

Figure 6:
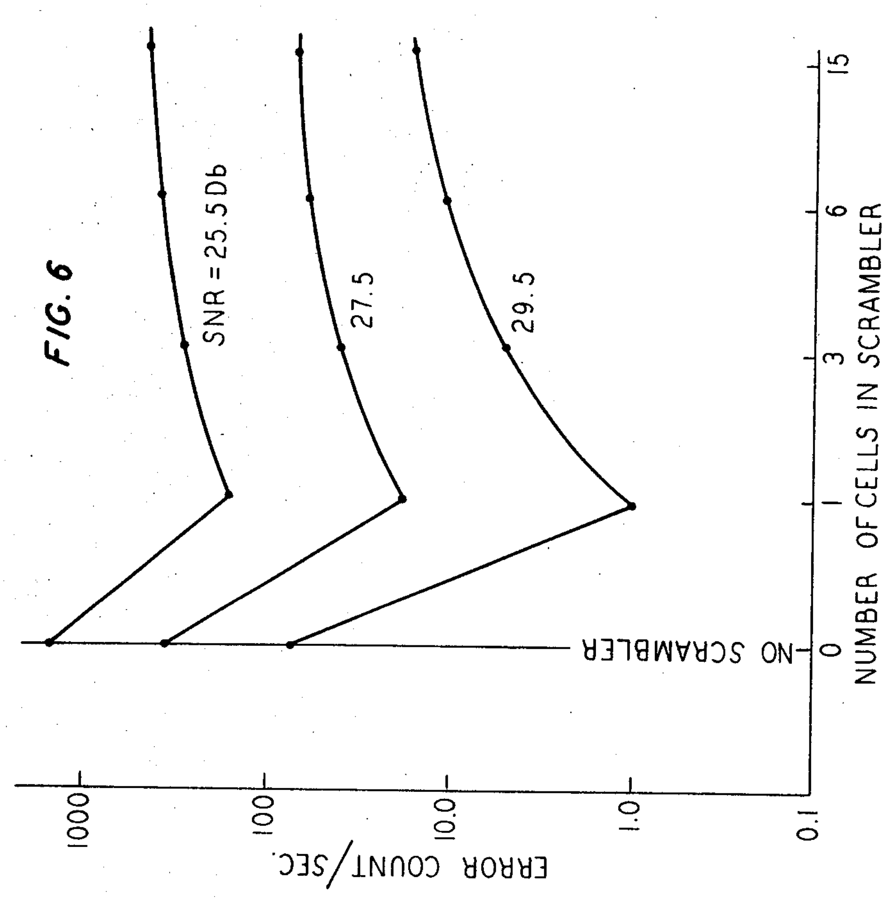
FIG. 6 shows a series of curves which point up the efficiency in error performance of the one-cell scrambler-descrambler apparatus.

FIG. 6 shows several curves which point up the greater efficiency in error performance of the one-cell scrambler-descrambler apparatus of the invention. Each curve shows the error count per second vs. the number of scrambler cells for a given signal to noise ratio. The transmission system utilized was essentially that illustrated in FIG. 1, operating at a 20.2 mb. rate. It should be noted that regardless of the number of scrambler cells used, a significant improvement in error performance was realized, but the greatest improvement was that provided by the single cell scrambler-descrambler apparatus of the invention.

The error rate of the Bell System's T2 digital transmission facility (and, to a lesser extent, the error rate of the T1) is controlled by intersystem far-end crosstalk (FEXT). This crosstalk interference power is, to a great extent, a function of the statistics of the digital data being transmitted. It has been found by applicant that the one-cell scrambler-descrambler apparatus of FIGS. 5A and 5B can be advantageously utilized, in such systems, to modify the signal statistics such that the far-end crosstalk is significantly reduced and degradation in error performance thereby improved.

Figure 7:
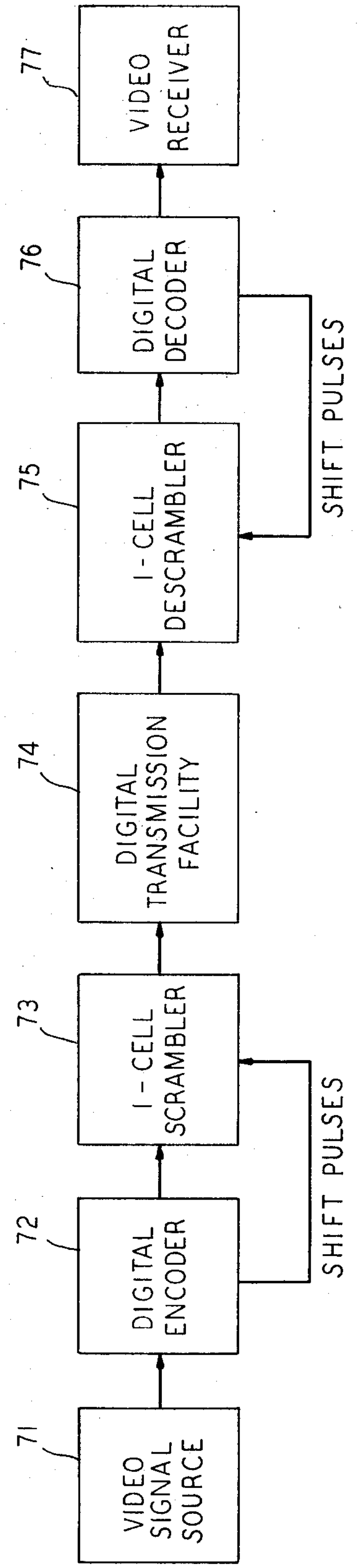
FIG. 7 is a simplified block diagram of a T2-type Digital System, used for video transmission purposes, which advantageously incorporates a one-cell scrambler-descrambler for reducing far-end crosstalk.

In FIG. 7 there is shown a block diagram schematic of a T2-type System used for video communication, which incorporates the one-cell scrambler-descrambler apparatus in accordance with the invention. The T2 Carrier System per se is disclosed in "Transmission Systems for Communications" by members of the Technical Staff of the Bell Telephone Laboratories, published by B.T.L. Inc., Fourth Edition (1970). The T2 is a bipolar digital transmission system, as is the T1 Carrier System described in the article "The T1 Carrier System" by D. F. Hoth, *Bell Telephone Laboratories RECORD*, Volume 40, No. 10, Nov. 1962, pages 358–363. A typical bipolar digital bit stream is illustrated and described on page 361 of the latter RECORD article.

The video signal source 71 may comprise a typical video telephone set which delivers an analog signal to the digital encoder 72 which, here again, can advantageously comprise a three-bit differential pulse code modulator. The digital bit stream output of encoder 72 is delivered to the one-cell scrambler 73 (such as shown in FIG. 5A) where the same is operated on a deterministically randomized manner, as heretofore described. The modified output signal from scrambler 73 is then transmitted via the digital transmission facility 74 (e.g., the Bell System's T2 digital transmission facility) to a remote location. At said remote location the received digital bit stream is then delivered to the one-cell descrambler 75 (such as that shown in FIG. 5B) where the same is deterministically operated on, in inverse fashion as heretofore described, so as to return the received digital signal to its original form prior to decoding. The digital decoder 76 can, here again, comprise a three-bit differential pulse code modulator. The output analog signal from the decoder 76 is then coupled to the video receiver 77, which in the assumed case may comprise a typical video telephone set.

Now it has been found that the coded, unscrambled signals transmitted over a T2-type System originally had a probability of binary ones ($P_c$) such that $0.39<P_c<0.57$, with the result that far-end crosstalk was experienced and in consequence a degradation in error performance was realized. However, by use of the one-cell scrambler-descrambler apparatus, as described, the scrambled signals, on a long term average, have a probability ($P_s$) of binary ones of 0.5. And, as a result thereof far-end crosstalk is significantly reduced and error performance thereby improved.

Table I shows how various unscrambled digitally encoded video signals whose statistics were such that $0.39<P_c<0.57$ have been randomized by the simple one-cell scrambler. In all cases, for the long term average, it was found that $P_s=0.5$ and error performance thereby substantially enhanced. As will be shown, theory supports this result.

TABLE I

| Coded Picture | Encoder signal statistics with and without one-cell scrambler | |
|---|---|---|
| | $P_c$ Probability of binary one without scrambler | $P_s$ Probability of binary one with one-cell scrambler |
| Subject, Head and Shoulders | 0.568 | 0.500 |
| Graphics | 0.532 | 0.500 |
| Idle Coder | 0.526 | 0.500 |
| Windowed checkerboard | 0.469 | 0.500 |
| Gray scale | 0.472 | 0.500 |
| Vertical stripes | 0.393 | 0.500 |

For the one-cell scrambler of FIG. 5A, it will be apparent to those in the art that the process is a two-state Markov chain whose transition table can be shown to be:

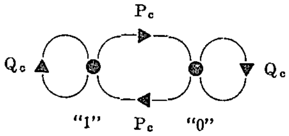

where $P_c$ = probability of a binary one in the input sequence; and $Q_c = 1-P_c$ = probability of a binary zero in the input sequence.

If it is assumed that the input sequence has uncorrelated bits and that $P_s$ = probability of a binary one in the output scrambled digital sequence; and $Q_s = 1-P_s$ = probability of a binary zero in the output scrambled sequence then it follows that:

$$P_s=P_s\cdot Q_c+Q_s\cdot P_c \quad (1)$$

and thus $$P_s(1-Q_c)=Q_s\cdot P_c \quad (2)$$

since $1-Q_c=P_c$ by definition, then $P_s\cdot P_c=Q_s\cdot P_c$ (3)

and it follows that $P_s=Q_s=0.5$.

While the previously described feature of the invention for use in advantageously modifying the signal statistics of certain digital data systems, namely, the Bell System's T1 and T2 Carrier Systems, it will be apparent to those skilled in the art that this feature will be of similar use in any bipolar digital transmission system.

Accordingly, it is to be understood that the above-described arrangements are merely illustrative of the applications of the principles of the present invention and other arrangements may be utilized by those skilled in the art without departing from the spirit and scope of the invention.

What is claimed is:

1. A multilevel digital transmission system comprising at least one analog signal source, digital encoding means coupled to said signal source and serving to convert the analog signal from said source to a predetermined digital bit stream, means for converting one or more input digital bit streams into a multilevel digital signal prior to transmission, and digital scrambling means disposed between said digital encoding means and the multilevel converting means, said scrambling means serving to operate on the input digital bit stream from said digital encoding means in a deterministically randomized manner so as to produce a digital output signal that is modified such as to substantially eliminate unwanted direct current shift in said multilevel digital signal, said scrambling means comprising a one-cell feedback shift register and a modulo-2 adder in the feedback path of said register.

2. A multilevel digital transmission system as defined in claim 1 wherein said digital encoding means comprises a differential pulse code modulator.

3. A multilevel digital transmission system as defined in claim 1 including remote receiving apparatus which includes digital descrambling means that operates on a received digital bit stream in a manner that is inversely related to the aforementioned scrambling operation so as to return the received digital bit stream to its original form prior to the decoding of the same.

4. In a digital transmission system which includes in series a digital encoder for converting an input analog signal to a digital bit stream and means for converting a digital bit stream into a multilevel digital signal prior to transmission, which system is characterized by a scrambler disposed between the digital encoder and the multilevel converting means, said scrambler comprising a one-cell feedback shift register and a modulo-2 adder connected in the register feedback path, said digital bit stream from the digital encoder being delivered to said modulo-2 adder, with the output from said scrambler being coupled to the multilevel converting means.

5. In a digital transmission system as defined in claim 4 wherein said digital encoder comprises a differential pulse code modulator.

6. In a digital transmission system as defined in claim 5 including remote receiving apparatus which apparatus is characterized by a digital descrambler having a one-cell feedback shift register and a moudlo-2 adder connected in the register feedback path, the received digital bit stream being coupled to said modulo-2 adder, with the output from said descrambler being coupled to a digital decoder in the receiving apparatus.

7. A bipolar digital transmission system comprising an analog signal source, digital encoding means coupled to said signal source and serving to convert the analog signal from said source to a predetermined digital bit stream, a bipolar digital transmission facility, and a scrambler disposed between said encoding means and the bipolar digital transmission facility, said scrambler comprising a one-cell feedback shift register and a modulo-2 adder connected in the register feedback path, said digital bit stream from said encoding means being delivered to said moudlo-2 adder, with the output from the scrambler being coupled to the bipolar transmission facility, said scrambler serving to convert the probability of binary ones in the input digital bit stream thereto to a probability ($P_s$) equal to 0.5 on a long term average.

8. A bipolar digital transmission system as defined in claim 7 wherein the digital encoding means comprises a differential pulse code modulator.

* * * * *